(No Model.)

D. F. SHAW.
TOY BIRD.

No. 334,812. Patented Jan. 26, 1886.

Witnesses.
S. N. Piper.
W. H. Preston

Inventor,
Daniel F. Shaw,
by R. H. Eddy atty.

N. PETERS. Photo-Lithographer. Washington. D. C.

UNITED STATES PATENT OFFICE.

DANIEL FRANKLIN SHAW, OF BROOKFIELD, MASSACHUSETTS.

TOY BIRD.

SPECIFICATION forming part of Letters Patent No. 334,812, dated January 26, 1886.

Application filed June 1, 1885. Serial No. 167,143. (No model.)

*To all whom it may concern:*

Be it known that I, DANIEL FRANKLIN SHAW, of Brookfield, in the county of Worcester, of the Commonwealth of Massachusetts, have invented a new and useful Improvement in Toy Birds; and I do hereby declare the same to be described in the following specification and represented in the accompanying drawings, of which—

Figure 1:
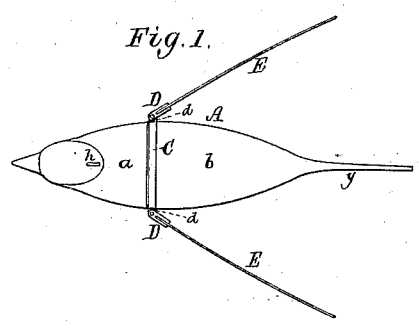
Figure 4:
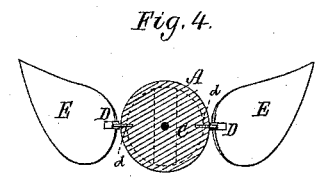
Figure 2:
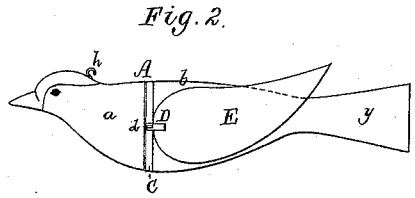
Figure 3:
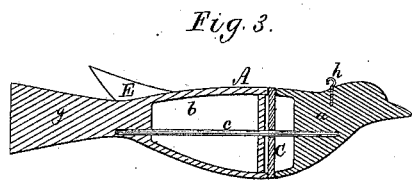
Figure 5:
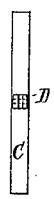
Figure 6:
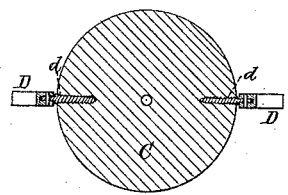

Figure 1 is a top view, Fig. 2 a side elevation, Fig. 3 a longitudinal section, and Fig. 4 a transverse section, of a bird containing my invention, the nature of which is defined in the claims hereinafter presented. The plane of section of the latter figure is through the rotative-wing holder. Fig. 5 is a side view, and Fig. 6 a vertical section, on an enlarged scale, of the rotative disk or ring and its wing-supporting arms, to be described.

In the said drawings, A denotes the body of a bird, which, as represented, is divided transversely through the breast into two parts, $a$ and $b$, they being connected by a pivot or wire, $c$, extending from one to the other at the axis of the body. The said two parts are arranged at a short distance asunder, and have between them a rotative disk or ring, C, to freely revolve on the wire $c$. Projecting from opposite parts of the ring or disk C are two short arms, D, each of which is connected to the said part C by a screw, $d$, that screws somewhat tightly into the part C, so as to be capable of being revolved transversely therein, such screw at its outer end being hinged or pivoted to the arm, so as to enable the latter to be turned, with the wing E applied to it, either toward or away from the body. From the above it will be seen that by such a connection with the part C each wing can be revolved laterally and moved or turned toward or away from the body, in order to set or adjust the wing to its proper position relatively to the body. The joints of the arm with the part C are to be stiff, so as to preserve the wing in its adjusted position while the bird may be in flight. Each arm D is split or furcated to receive the wing, which is inserted and forced tightly between the prongs of the arm. The rear portion of the body, carrying the tail $y$, can, if desirable, be applied to the connecting-wire $c$, so as to be capable of being turned with friction thereon, in order to adjust the tail to any desirable inclination laterally with respect to the body.

There projects from the head of the bird a small staple or eye, $h$, to which a line or cord at one end of it may be attached, such line or cord at its other end being fixed to one end of a pole or rod, to be grasped near its other end in the hand of a person.

When the two wings are properly adjusted—that is, with the convex side of one uppermost and that of the other lowermost—and the bird by means of the pole and line is swung around in a circle through the atmosphere, the wings and the part C will revolve together relatively to the body of the bird, it being understood that the bird should be weighted in or by the head, so as to cause the body to maintain a horizontal position, or essentially so, when hanging from the line. The wings, on revolving, will cause the bird to have the appearance of rapidly flying through the air.

The body and wings of the bird may be constructed of wood or any other suitable material or materials.

With the arms connected to the rotary disk or ring by universal joints, as described, the wings can be folded against the body for packing the bird or reducing it in compass, as occasion may require.

I claim—

1. The combination of the bird-body and the wings with the rotative ring or disk arranged within and pivoted to the said body, and with the two arms projecting from such ring or disk and applied thereto and to the wings, substantially as set forth.

2. The combination of the wings and body of the bird with a rotative ring or disk arranged in and applied to the body, substantially as represented, such wings being connected with the said ring or disk and adjusted so as to revolve with it when the bird is driven through the air, as explained.

3. The bird having a tail projecting from its body, and also having each of the two wings connected with the body by a rotary ring, disk, or device to cause the wings, by the resistance of the air while the bird may be swung or drawn through it, to revolve transversely about the body, as set forth.

DANIEL FRANKLIN SHAW.

Witnesses:
R. H. EDDY,
ERNEST B. PRATT.